United States Patent
Zhang (10) Patent No.: US 9,894,193 B2
(45) Date of Patent: Feb. 13, 2018

(54) ELECTRONIC DEVICE AND VOICE CONTROLLING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Xue-Qin Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/220,347

(22) Filed: Jul. 26, 2016

(65) Prior Publication Data

US 2017/0289327 A1 Oct. 5, 2017

(30) Foreign Application Priority Data

Apr. 5, 2016 (CN) .......................... 2016 1 0200324

(51) Int. Cl.
*H04M 1/60* (2006.01)
*H04W 4/12* (2009.01)
*H04W 76/04* (2009.01)

(52) U.S. Cl.
CPC .......... *H04M 1/6041* (2013.01); *H04W 4/12* (2013.01); *H04W 76/046* (2013.01)

(58) Field of Classification Search
USPC ........................................... 455/569.1, 414.3
See application file for complete search history.

(56) References Cited

U.S. PATENT DOCUMENTS

| | | | | |
|---|---|---|---|---|
| 6,348,935 B1* | 2/2002 | Malacinski | ........... | G06F 3/0481 715/840 |
| 7,418,392 B1* | 8/2008 | Mozer | ..................... | G10L 15/26 315/307 |
| 2002/0002039 A1* | 1/2002 | Qureshey | .......... | G06F 17/30749 455/344 |
| 2002/0032510 A1* | 3/2002 | Turnbull | ................... | B60R 1/12 701/49 |
| 2006/0041655 A1* | 2/2006 | Holloway | ................. | G06F 1/18 709/223 |
| 2008/0046873 A1* | 2/2008 | Rumsey | .............. | G06F 9/44505 717/143 |
| 2009/0117945 A1* | 5/2009 | Mahler | ............... | H04M 1/6041 455/569.1 |
| 2011/0257973 A1* | 10/2011 | Chutorash | .......... | G01C 21/3661 704/235 |
| 2011/0299427 A1* | 12/2011 | Chu | ..................... | H04L 12/1822 370/256 |
| 2012/0078841 A1* | 3/2012 | Nakamura | ........ | G06F 17/30345 707/618 |

(Continued)

*Primary Examiner* — Edward Urban
*Assistant Examiner* — Ralph H Justus
(74) *Attorney, Agent, or Firm* — ScienBiziP, P.C.

(57) ABSTRACT

A method of controlling an electronic device by voice of user includes establishing a central control tree for the electronic device. User voice is obtained and deciphered and is recognized if content of voice is in accordance with textual commands stored in device. Device may also speak to user offering options that user may vocally select an confirm. Execution of operations to the electronic device is controlled according to the central control tree based upon the recognized voice content.

20 Claims, 5 Drawing Sheets

(56) References Cited

U.S. PATENT DOCUMENTS

| | | | |
|---|---|---|---|
| 2012/0173238 A1* | 7/2012 | Mickelsen | G10L 15/30 704/246 |
| 2013/0246920 A1* | 9/2013 | Fields | G06F 9/44 715/728 |
| 2014/0244272 A1* | 8/2014 | Shao | G06F 3/01 704/275 |
| 2016/0253059 A1* | 9/2016 | Choi | G06F 3/0488 715/776 |

* cited by examiner

ELECTRONIC DEVICE AND VOICE CONTROLLING METHOD

CROSS-REFERENCE TO RELATED APPLICATIONS

This application claims priority to Chinese Patent Application No. 201610200324.9 filed on Apr. 5, 2016, the contents of which are incorporated by reference herein. This application is related to a commonly-assigned application entitled, "SMART CAP AND VOICE CONTROLLING METHOD", filed Aug. 4, 2016 Ser. No. 15/227,965.

FIELD

The subject matter herein generally relates to controlling technology, and particularly to an electronic device and a method for controlling the electronic device using voices.

BACKGROUND

Generally, when a user uses an electronic device such as a mobile phone, or a smart watch, the user needs to operate the electronic device manually. However, this kind of operating method is not suitable for all users.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
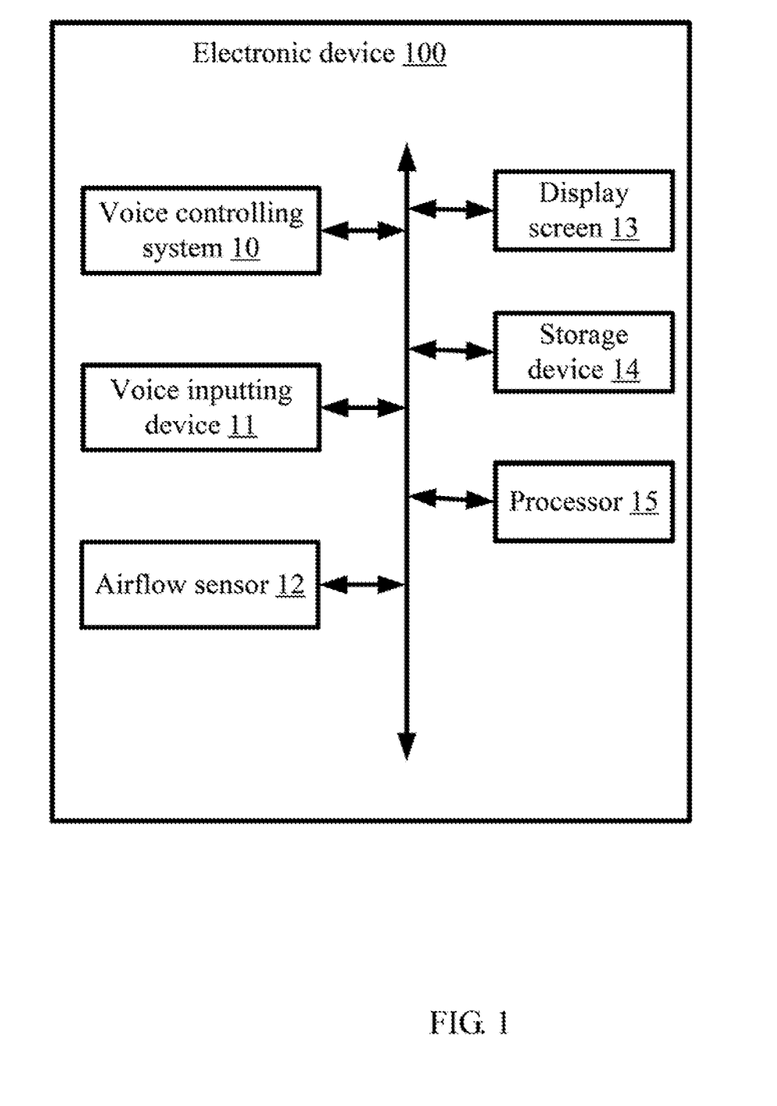
FIG. 1 is a block diagram of one embodiment of an electronic device including a voice controlling system.

FIG. 1 is a block diagram of one embodiment of an electronic device. Depending on the embodiment, an electronic device 100 includes a voice controlling system 10. The voice controlling system 10 is used to control the electronic device 100 according to voice of a user. The electronic device 100 further includes, but is not limited to, a voice inputting device 11, an airflow sensor 12, a display screen 13, a storage device 14, and at least one processor 15. The electronic device 100 can be a smart phone, a smart watch, a personal digital assistant (PDA), a tablet computer, or any other suitable electronic device.

In at least one embodiment, the voice inputting device 11 can be a microphone that is internally or externally connected to the electronic device 100. In other embodiments, the voice inputting device 11 can also be an earpiece microphone that is configured on an earphone, which is connected to the electronic device 100.

In at least one embodiment, the airflow sensor 12 is used to monitor airflow of a mouth and/or a nose of the user.

In at least one embodiment, when the airflow of the mouth or nose of the user is detected by the airflow sensor 12, the voice controlling system 10 can obtain voice data of the user from the voice inputting device 11, and control the electronic device 100 based upon the voice data of the user. In other embodiments, the electronic device 100 does not include the airflow sensor 12, and the voice controlling system 10 can directly obtain voice data from the voice inputting device 11.

It should be noted that the purpose of the voice controlling system 10 obtaining the voice data when the airflow is detected is for avoiding mistaken instructions. For example, when the airflow of the mouth and nose of the user is not taken into consideration, the voice controlling system 100 can directly obtain the voice data from the voice inputting device 11. If the voice data is inputted by a person around the electronic device 100 who is not the user, then the electronic device 100 is likely to be mistakenly controlled by the person that is around the electronic device 100. In other words, the voice controlling system 10 obtains the voice data when the airflow is detected can render the electronic device 100 being controlled more accurately.

In at least one embodiment, the display screen 13 can be a normal screen or a touch screen that is configured with a function of touch input.

In at least one embodiment, the storage device 14 can be an internal storage device, such as a flash memory, a random access memory (RAM) for temporary storage of information, and/or a read-only memory (ROM) for permanent storage of information. The storage device 14 can also be an external storage device, such as an external hard disk, a storage card, or a data storage medium. In at least one embodiment, the storage device 14 stores a number of applications of the electronic device 100. The number of applications may include, but is not limited to, a telephone application, a music application, a power management application, and a short messaging service (SMS) application.

In at least one embodiment, the at least one processor 15 can be a central processing unit (CPU), a microprocessor, or other data processor chip that performs functions of the electronic device 100.

Figure 2:
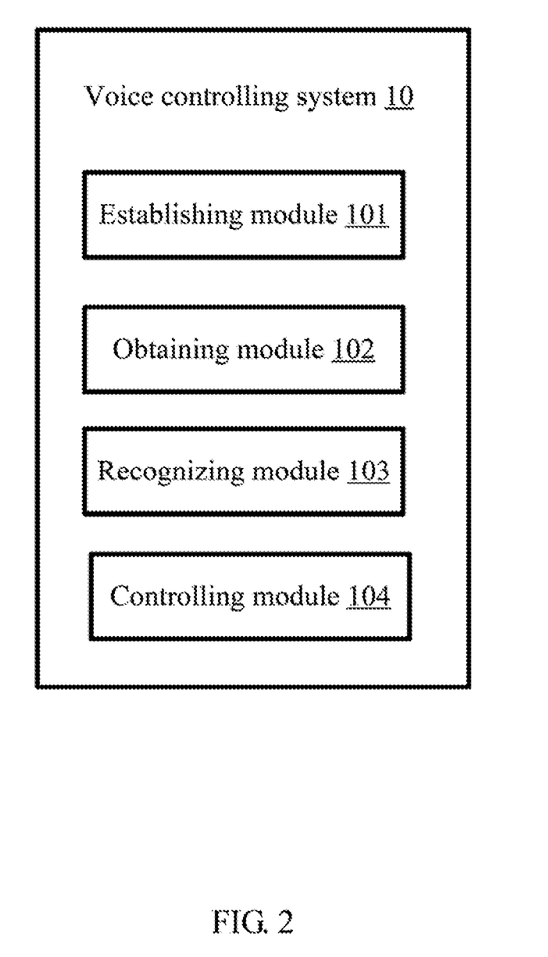
FIG. 2 is a block diagram of one embodiment of modules of the voice controlling system of FIG. 1.

FIG. 2 shows one embodiment of modules of the voice controlling system 10. In at least one embodiment, the voice controlling system 10 can include an establishing module 101, an obtaining module 102, a recognizing module 103, and a control module 104. The modules 101-104 can include computerized codes in the form of one or more programs, which are stored in the storage device 14, and are executed by the at least one processor 15 of the electronic device 100.

In at least one embodiment, the establishing module 101 can establish a central control tree for the electronic device 100.

In at least one embodiment, the establishing module 101 can establish a single control tree for each of the number of applications of the electronic device 100, to obtain a number of single control trees. The establishing module 101 can further establish the central control tree by merging the number of single control trees according to a tree structure.

In at least one embodiment, a single control tree can be defined to be a rule used for controlling an application of the electronic device 100. Similarly, the central control tree can be defined to be a rule used for controlling operations performed by the electronic device 100. The rules can be set according to the tree structure that may be defined by a trunk of a tree, one or more branches of the trunk, and one or more leaves of each of the one or more branches.

In at least one embodiment, the establishing module 101 establishes the number of single control trees according to the following four steps.

First, the establishing module 101 sets first text information corresponding to a first function of the electronic device 100. The establishing module 101 creates a root node of a single control tree, and establishes a first relationship between the root node and the first text information.

In at least one embodiment, the first function includes, but is not limited to, a function of powering off the electronic device 100, a function of rebooting the electronic device 100, a function of locking the electronic device 100, a function of controlling the electronic device 100 to enter a sleep state, and the like. In other embodiments, the first function can be executed after a predetermined time period such as 5 minutes.

In at least one embodiment, the first text information can be information describing the first function. For example, when the first function is power off the electronic device 100, the first text information can be such as "power off the electronic device". In at least one embodiment, the establishing module 101 can set the first text function according to user's requirement. For example, the establishing module 101 can set the first text function in response to user's input through the display screen 13.

In at least one embodiment, the establishing module 101 can provide the user a setting interface for setting the first function and the corresponding first text information.

For example, on the setting interface, the user can set the first function including locking the display screen 13 of the electronic device 100. The user can further set the first text information including text "lock display screen".

Second, the establishing module 101 can set second text information corresponding to one of the number of applications. The establishing module 101 can further create a father node of the single control tree, and establish a second relationship between the second text information and the father node.

In at least one embodiment, the establishing module 101 can display icons of the number of applications on the setting interface when the first relationship is established. The establishing module 101 can set one of the number of applications is selected by the user in response to touch input received from the display screen 13.

In at least one embodiment, the establishing module 101 can set a name of the selected application to be text information corresponding to the selected application. For example, when the user selects the telephone application, the establishing module 101 can set "telephone" as the text information corresponding to the telephone application.

Third, the establishing module 101 can set a number of function options of the one of the number of applications, and set third text information corresponding to each of the number of function options. The establishing module 101 can create a number of child nodes for the father node according to a number of the number of function options. In at least one embodiment, a quantity of the number of the child nodes equals the quantity of the number of function options. The establishing module 101 can further establish a third relationship between each of the number of child node and corresponding third text information.

In at least one embodiment, when the second relationship is established, the establishing module 101 can display the number of function options on the setting interface, and determine the third text information corresponding to each of the number of function options, in response to user's input. In other embodiments, the establishing module 101 can determine a name of each of the number of function options to be the corresponding third text information.

For example, it is assumed that the telephone application is selected by the user. When the second relationship is established, the establishing module 101 can display the number of function options of the telephone application on the setting interface. The number of functions options of the telephone application may include, but is not limited to, a first function option of making a call, a second function option of querying all received calls, a third function option of querying all answered calls, and a fourth function option of querying missed calls. The establishing module 101 can set "make call" as the text information corresponding to the first function option. Similarly, the establishing module 101 can set "query received calls" as the text information corresponding to the second function option, set "query answered calls" as the text information corresponding to the third function option, and set "query missed calls" as the text information corresponding to the fourth function option.

Fourth, the establishing module 101 can establish a single control tree for each of other applications of the number of applications according to the above steps. Therefore, the establishing module 101 can obtain the number of single control trees, each of which corresponds to one of the number of the applications.

In at least one embodiment, the establishing module 101 can further set a serial number for each node (i.e., the root node, the father node, the child nodes) of each of the number of single control trees. In other words, the root node, the father node, and each of the child nodes of each of the number of single control trees can have a serial number.

In at least one embodiment, the establishing module 101 can set the serial number for the each node of each of the number of single control trees, according to an order of creating each of the number of single control trees. In at least one embodiment, the establishing module 101 can set the serial number of the root node of each of the number of single control trees to be a same number such as "0".

Figure 3:
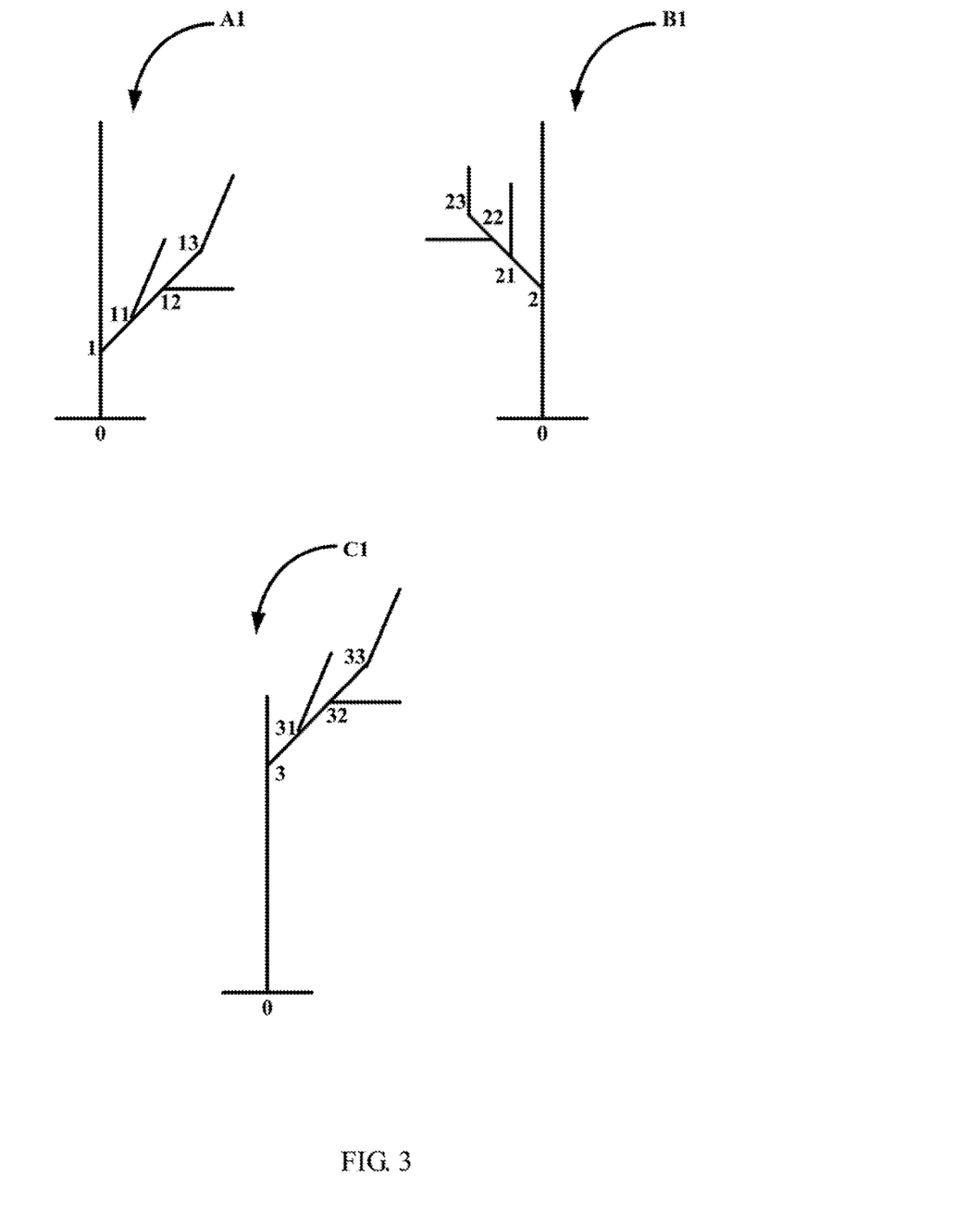
FIG. 3 illustrates an example of establishing a single control tree for an application of the electronic device of FIG. 1.

For example, it is assumed that the establishing module 101 establishes three single control trees for three applications of the electronic device 100. The three applications include an application "A", an application "B", and an application "C". As shown in FIG. 3, the establishing module 101 establishes a single control tree "A1" for the application "A". The establishing module 101 further sets a serial number "0" for the root node of the single control tree "A1", sets a serial number "1" for the father node of the single control tree "A1", and respectively sets serial numbers "11", "12", "13" for three child nodes of the single control tree "A1". Similarly, the establishing module 101 establishes a single control tree "B1" for the application "B". The establishing module 101 further sets the serial number "0" for the root node of the single control tree "B1", sets a serial number "2" for the father node of the single control tree "B1", and respectively sets serial numbers "21", "22", "23" for three child nodes of the single control tree "B1". Similarly, the establishing module 101 establishes a single control tree "C1" for the application "C". The establishing module 101 further sets the serial number "0" for the root node of the single control tree "C1", sets a serial number "3" for the father node of the single control tree "C1", and respectively sets serial numbers "31", "32", "33" for three child nodes of the single control tree "C1".

In at least one embodiment, when the establishing module 101 establishes the central control tree according to the tree structure, the establishing module 101 first merges all the root nodes of the number of single control trees to be one root node, and then merges each father node and merges each child node of each of the number of single control trees on one single control tree to obtain a merged control tree. The establishing module 101 can set the merged control tree to be the central control tree.

In at least one embodiment, the establishing module 101 can establish the central control tree by merging the number of single control trees according to the tree structure based upon the serial number of each node of each of the number of single control trees. In at least one embodiment, the establishing module 101 can merge the nodes having the same serial number to be one node. For example, the establishing module 101 can merge the root nodes having the same serial number "0" to be one root node of the central control tree. The establishing module 101 can further merge the father node and child nodes of each of the number of single control trees not having the same serial numbers on the central control tree.

Figure 4:
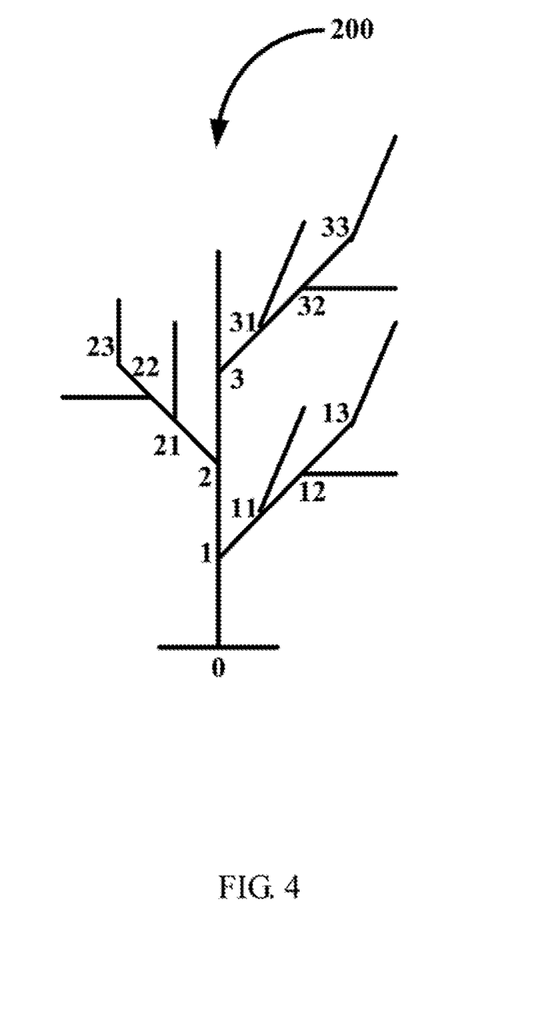
FIG. 4 illustrates an example of establishing a central control tree for the electronic device of FIG. 1.

For example, as shown in FIG. 4, the establishing module 101 can merge the single control trees "A1", "B1", and "C1" to be a central control tree 200 according to the tree structure, based upon the serial number of each node of each of the three single control trees "A1", "B1", and "C1".

In at least one embodiment, the establishing module 101 can display the central control tree on the display screen 13 in response to user's input, and adjust the central control tree in response to user's operations to the central control tree.

In at least one embodiment, the establishing module 101 can delete a single control tree corresponding to one of the number of applications from the central control tree. The establishing module 101 can also add to the central control tree a single control tree corresponding to a new application. The new application can be an application of the electronic device 100 of which a single control tree has not been added to the central control tree. For example, the new application may be a new application that is recently installed in the electronic device 100.

In at least one embodiment, when a first signal is received, the establishing module 101 can delete from the central control tree the single control tree corresponding to one of the number of applications. When a second signal is received, the establishing module 101 can add to the central control tree the single control tree corresponding to the new application. In at least one embodiment, the first signal is generated when the user touches a father node of a single control tree corresponding to one of the number of applications, for a predetermined time period (e.g., 5 seconds). The second signal is generated when the user double clicks the central control tree.

For one example, when the user touches the father node "2" corresponding to application "B" on the central control tree 200 for the predetermined time period, the establishing module 101 can issue a prompt for user to select whether a voice controlling method corresponding to the application "B" is to be deleted. If the voice controlling method corresponding to the application "B" is determined to be deleted in response to user's input, the establishing module 101 can delete the father node and child nodes corresponding to the application "B" from the central control tree 200. That is, the signal control tree "B1" corresponding to the application "B" is deleted from the central control tree 200.

For another example, when the user double clicks on the central control tree 200, the establishing module 101 can display all applications of the electronic device 100 which have single control trees not added to the central control tree 200 on the display screen 13. The establishing module 101 can determine which application is selected by the user, and set text information corresponding to the selected application and text information corresponding to each of function options of the selected application. The establishing module 101 can create a father node on the central control tree 200, and establish a relationship between the father node and the text information corresponding to the selected application. The establishing module 101 can create a number of child notes for the father node according to the function options of the selected application. The establishing module 101 can further establish a relationship between each of the child nodes and the text information of each of the function options of the selected application. In at least one embodiment, the establishing module 101 can further set a serial number for the father node and each of the child nodes corresponding to the selected application.

In at least one embodiment, when a single control tree of one of the number of applications is deleted from the central control tree, the establishing module 101 can correspondingly adjust the serial numbers of other applications of the number of applications on the central control tree.

For example, when the single control tree corresponding to the application "B" is deleted from the central control tree 200, the establishing module 101 can adjust the serial number of the father node corresponding to the application "C" by replacing "3" with "2", and adjust the serial number of the child nodes corresponding to the application "C" by respectively replacing "31", "32", and "33" with "21", "22", and "23".

In at least one embodiment, the obtaining module 102 can obtain voice data.

In at least one embodiment, the obtaining module 102 can obtain the voice data from the voice inputting device 11 when the airflow sensor 12 detects airflow of the mouth or nose of the user.

It should be noted that the obtaining module 102 obtains the voice data when the airflow of the mouth or nose of the user is detected, is to avoid mistakenly obtaining voice data of people except the user who are around the electronic device 100. In other words, more accurate voice data can be obtained if the obtaining module 102 obtains the voice data when the airflow of the mouth or nose of the user is detected.

In other embodiments, the obtaining module 102 can directly obtain the voice data from the voice inputting device 11. In other words, the obtaining module 102 may not require airflow of the mouth or nose of the user to be detected as a precondition for obtaining voice. The electronic device 100 may not include the airflow sensor 12.

In at least one embodiment, the voice inputting device 11 can be a microphone that is internally or externally connected to the electronic device 100. In other embodiments, the voice inputting device 11 can also be an earpiece microphone that is configured on an earphone, which is connected to the electronic device 100.

In at least one embodiments, the obtaining module 102 can further de-noise noise in the obtained voice data to obtain de-noised voice data.

In at least one embodiment, the obtaining module 102 can de-noise the noise in the obtained voice data using an anti-aliasing filter, a pre-emphasis filter, and/or an end point detector.

In at least one embodiments, the recognizing module 103 can recognize the de-noised voice data to obtain recognized voice data. It should be noted that if the obtained voice data is not de-noised, the recognizing module 103 can also recognize the obtained voice data that is not de-noised.

In at least one embodiment, the recognized voice data is obtained by converting the de-noised voice data to text information. In other words, the recognized voice data is the converted text information. In at least one embodiments, the recognizing module 103 can convert the de-noised voice data to the text information using a voice recognizing technology.

In at least one embodiments, the controlling module 104 can control an operation to the electronic device 100 according to the central control tree based upon the recognized voice data.

In at least one embodiment, the controlling module 104 can determine whether there is a node of the central control tree corresponding to the converted text information, by comparing the converted text information with the text information corresponding to each node of the central control tree. When the converted text information matches the text information corresponding one node of the central control tree, the controlling module 104 can determine the one node of the central control tree which corresponds to the converted text information, and obtain a determined node. The controlling module 104 can trigger a function corresponding to the determined node.

In at least one embodiment, when the determined node is the root node of the central control tree, the controlling module 104 controls the electronic device 100 to execute a first function, such as power off the electronic device 100, or boot the electronic device 100, or lock the electronic device 100, or control the electronic device 100 to enter a sleep state.

In at least one embodiment, when the determined node is a father node of the central control tree, the controlling module 104 controls the electronic device 100 to run the application corresponding to the father node.

For one example, when the determined node is the father node "1" of the central control tree, and the father node "1" corresponds to the telephone application, the controlling module 104 can control the electronic device 100 to run the telephone application.

For another example, when the application corresponding to the father node is run, the controlling module 104 can further broadcast text information corresponding to each of the child nodes of the father node using voices. Then the user can know which function options are included in the application. The obtaining module 102 can further obtain current voice data. The recognizing module 103 can further convert the current voice data to current text information. The controlling module 104 can further determine a current child node corresponding to the current text information by comparing the current text information with the text information of each of the child nodes of the father node. The controlling module 104 can further trigger a function corresponding to the current child node.

For example, when the telephone application of the electronic device is run, the controlling module 104 broadcasts the text information of the function options of the telephone application such as "make a call", "query received calls", "query answered calls", and the "query missed calls" using voices. When the recognizing module 103 recognizes the text information of the current voice data obtained from the voice inputting device 11 is the "query missed calls", the controlling module 104 controls the telephone application to list phone numbers of all missed calls, and display all the phone numbers on the display screen 13.

In at least one embodiment, when one application such as a music application of the electronic device 100 is run, if the electronic device 100 receives an incoming call from another electronic device, the controlling module 104 can broadcast the incoming call using voices, and determine whether to answer the incoming call or not according to voice data inputted by the user.

Figure 5:
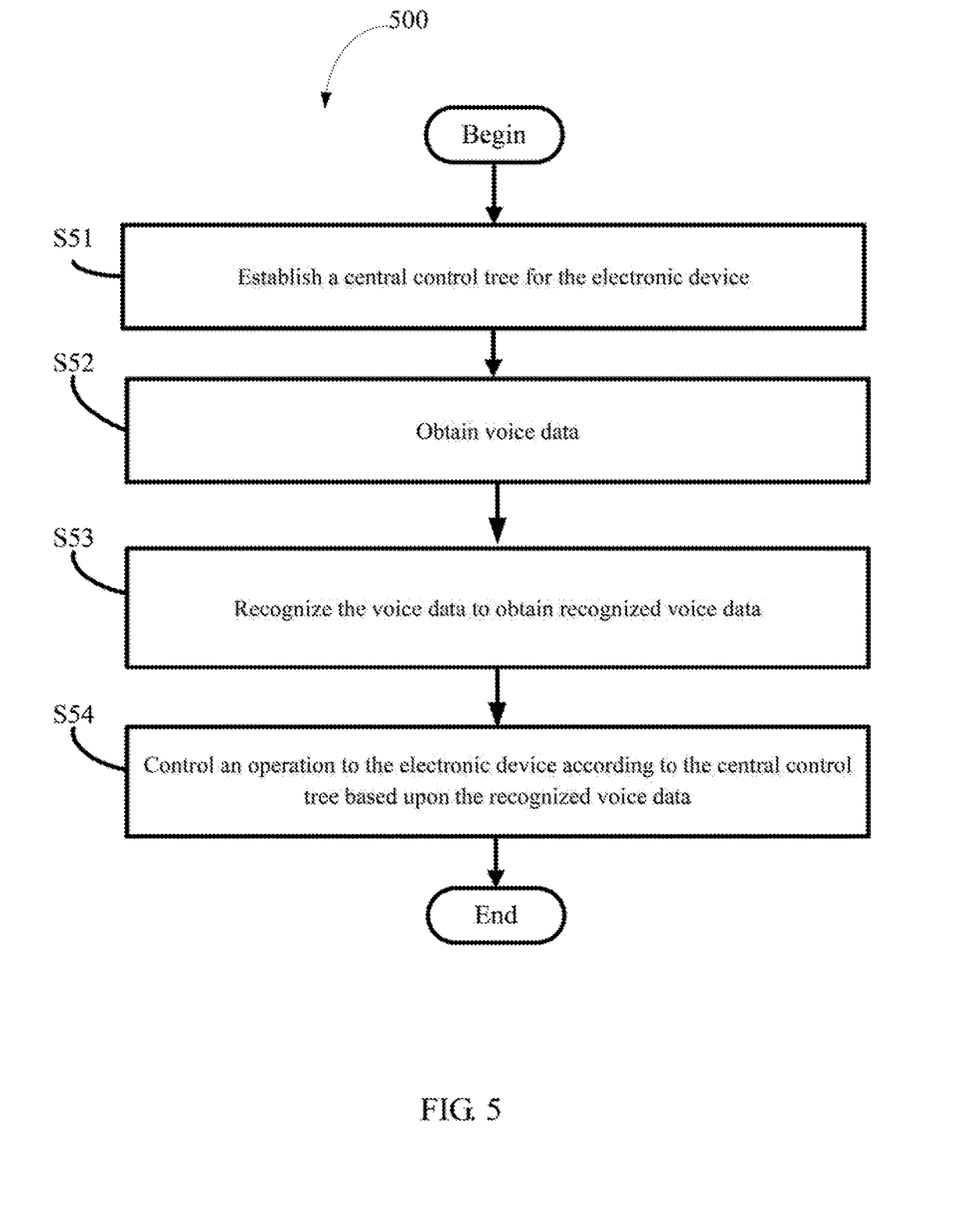
FIG. 5 illustrates a flowchart of one embodiment of a method for controlling the electronic device of FIG. 1 using voice.

FIG. 5 illustrates a flowchart which is presented in accordance with an example embodiment. The example method 500 is provided by way of example, as there are a variety of ways to carry out the method. The method 500 described below can be carried out using the configurations illustrated in FIG. 1, for example, and various elements of these figures are referenced in explaining example method 500. Each block shown in FIG. 5 represents one or more processes, methods, or subroutines, carried out in the exemplary method 500. Additionally, the illustrated order of blocks is by example only and the order of the blocks can be changed according to the present disclosure. The exemplary method 500 can begin at block 51. Depending on the embodiment, additional steps can be added, others removed, and the ordering of the steps can be changed.

At block 51, the establishing module 101 can establish a central control tree for the electronic device 100.

In at least one embodiment, the establishing module 101 can establish a single control tree for each of the number of applications of the electronic device 100, to obtain a number of single control trees. The establishing module 101 can further establish the central control tree by merging the number of single control trees according to a tree structure.

In at least one embodiment, a single control tree can be defined to be a rule used for controlling an application of the electronic device 100. Similarly, the central control tree can be defined to be a rule used for controlling operations performed by the electronic device 100. The rules can be set according to the tree structure that may be defined by a trunk of a tree, one or more branches of the trunk, and one or more leaves of each of the one or more branches.

In at least one embodiment, the establishing module 101 establishes the number of single control trees according to the following four steps.

First, the establishing module 101 sets first text information corresponding to a first function of the electronic device 100. The establishing module 101 creates a root node of a single control tree, and establishes a first relationship between the root node and the first text information.

In at least one embodiment, the first function includes, but is not limited to, a function of powering off the electronic device 100, a function of rebooting the electronic device 100, a function of locking the electronic device 100, a function of controlling the electronic device 100 to enter a sleep state, and the like. In other embodiments, the first function can be executed after a predetermined time period such as 5 minutes.

In at least one embodiment, the first text information can be information describing the first function. For example, when the first function is power off the electronic device 100, the first text information can be such as "power off the electronic device". In at least one embodiment, the establishing module 101 can set the first text function according to user's requirement. For example, the establishing module 101 can set the first text function in response to user's input through the display screen 13.

In at least one embodiment, the establishing module 101 can provide the user a setting interface for setting the first function and the corresponding first text information.

For example, on the setting interface, the user can set the first function including locking the display screen 13 of the electronic device 100. The user can further set the first text information including text "lock display screen".

Second, the establishing module 101 can set second text information corresponding to one of the number of applications. The establishing module 101 can further create a father node of the single control tree, and establish a second relationship between the second text information and the father node.

In at least one embodiment, the establishing module 101 can display icons of the number of applications on the setting interface when the first relationship is established. The establishing module 101 can set one of the number of applications is selected by the user in response to touch input received from the display screen 13.

In at least one embodiment, the establishing module 101 can set a name of the selected application to be text information corresponding to the selected application. For example, when the user selects the telephone application, the establishing module 101 can set "telephone" as the text information corresponding to the telephone application.

Third, the establishing module 101 can set a number of function options of the one of the number of applications, and set third text information corresponding to each of the number of function options. The establishing module 101 can create a number of child nodes for the father node according to a number of the number of function options. In at least one embodiment, a quantity of the number of the child nodes equals the quantity of the number of function options. The establishing module 101 can further establish a third relationship between each of the number of child node and corresponding third text information.

In at least one embodiment, when the second relationship is established, the establishing module 101 can display the number of function options on the setting interface, and determine the third text information corresponding to each of the number of function options, in response to user's input. In other embodiments, the establishing module 101 can determine a name of each of the number of function options to be the corresponding third text information.

For example, it is assumed that the telephone application is selected by the user. When the second relationship is established, the establishing module 101 can display the number of function options of the telephone application on the setting interface. The number of functions options of the telephone application may include, but is not limited to, a first function option of making a call, a second function option of querying all received calls, a third function option of querying all answered calls, and a fourth function option of querying missed calls. The establishing module 101 can set "make call" as the text information corresponding to the first function option. Similarly, the establishing module 101 can set "query received calls" as the text information corresponding to the second function option, set "query answered calls" as the text information corresponding to the third function option, and set "query missed calls" as the text information corresponding to the fourth function option.

Fourth, the establishing module 101 can establish a single control tree for each of other applications of the number of applications according to the above steps. Therefore, the establishing module 101 can obtain the number of single control trees, each of which corresponds to one of the number of the applications.

In at least one embodiment, the establishing module 101 can further set a serial number for each node (i.e., the root node, the father node, the child nodes) of each of the number of single control trees. In other words, the root node, the father node, and each of the child nodes of each of the number of single control trees can have a serial number.

In at least one embodiment, the establishing module 101 can set the serial number for the each node of each of the number of single control trees, according to an order of creating each of the number of single control trees. In at least one embodiment, the establishing module 101 can set the serial number of the root node of each of the number of single control trees to be a same number such as "0".

For example, it is assumed that the establishing module 101 establishes three single control trees for three applications of the electronic device 100. The three applications include an application "A", an application "B", and an application "C". As shown in FIG. 3, the establishing module 101 establishes a single control tree "A1" for the application "A". The establishing module 101 further sets a serial number "0" for the root node of the single control tree "A1", sets a serial number "1" for the father node of the single control tree "A1", and respectively sets serial numbers "11", "12", "13" for three child nodes of the single control tree "A1". Similarly, the establishing module 101 establishes a single control tree "B1" for the application "B". The establishing module 101 further sets the serial number "0" for the root node of the single control tree "B1", sets a serial number "2" for the father node of the single control tree "B1", and respectively sets serial numbers "21", "22", "23" for three child nodes of the single control tree "B1". Similarly, the establishing module 101 establishes a single control tree "C1" for the application "C". The establishing module 101 further sets the serial number "0" for the root node of the single control tree "C1", sets a serial number "3" for the father node of the single control tree "C1", and respectively sets serial numbers "31", "32", "33" for three child nodes of the single control tree "C1".

In at least one embodiment, when the establishing module 101 establishes the central control tree according to the tree structure, the establishing module 101 first merges all the root nodes of the number of single control trees to be one root node, and then merges each father node and merges each child node of each of the number of single control trees on one single control tree to obtain a merged control tree. The establishing module 101 can set the merged control tree to be the central control tree.

In at least one embodiment, the establishing module 101 can establish the central control tree by merging the number of single control trees according to the tree structure based upon the serial number of each node of each of the number of single control trees. In at least one embodiment, the establishing module 101 can merge the nodes having the same serial number to be one node. For example, the establishing module 101 can merge the root nodes having the same serial number "0" to be one root node of the central control tree. The establishing module 101 can further merge the father node and child nodes of each of the number of single control trees not having the same serial numbers on the central control tree.

For example, as shown in FIG. 4, the establishing module 101 can merge the single control trees "A1", "B1", and "C1" to be a central control tree 200 according to the tree structure, based upon the serial number of each node of each of the three single control trees "A1", "B1", and "C1".

In at least one embodiment, the establishing module 101 can display the central control tree on the display screen 13 in response to user's input, and adjust the central control tree in response to user's operations to the central control tree.

In at least one embodiment, the establishing module 101 can delete a single control tree corresponding to one of the number of applications from the central control tree. The establishing module 101 can also add to the central control tree a single control tree corresponding to a new application. The new application can be an application of the electronic device 100 of which a single control tree has not been added to the central control tree. For example, the new application may be a new application that is recently installed in the electronic device 100.

In at least one embodiment, when a first signal is received, the establishing module 101 can delete from the central control tree the single control tree corresponding to one of the number of applications. When a second signal is received, the establishing module 101 can add to the central control tree the single control tree corresponding to the new application. In at least one embodiment, the first signal is generated when the user touches a father node of a single control tree corresponding to one of the number of applications, for a predetermined time period (e.g., 5 seconds). The second signal is generated when the user double clicks the central control tree.

For one example, when the user touches the father node "2" corresponding to application "B" on the central control tree 200 for the predetermined time period, the establishing module 101 can issue a prompt for user to select whether a voice controlling method corresponding to the application "B" is to be deleted. If the voice controlling method corresponding to the application "B" is determined to be deleted in response to user's input, the establishing module 101 can delete the father node and child nodes corresponding to the application "B" from the central control tree 200. That is, the signal control tree "B1" corresponding to the application "B" is deleted from the central control tree 200.

For another example, when the user double clicks on the central control tree 200, the establishing module 101 can display all applications of the electronic device 100 which have single control trees not added to the central control tree 200 on the display screen 13. The establishing module 101 can determine which application is selected by the user, and set text information corresponding to the selected application and text information corresponding to each of function options of the selected application. The establishing module 101 can create a father node on the central control tree 200, and establish a relationship between the father node and the text information corresponding to the selected application. The establishing module 101 can create a number of child notes for the father node according to the function options of the selected application. The establishing module 101 can further establish a relationship between each of the child nodes and the text information of each of the function options of the selected application. In at least one embodiment, the establishing module 101 can further set a serial number for the father node and each of the child nodes corresponding to the selected application.

In at least one embodiment, when a single control tree of one of the number of applications is deleted from the central control tree, the establishing module 101 can correspondingly adjust the serial numbers of other applications of the number of applications on the central control tree.

For example, when the single control tree corresponding to the application "B" is deleted from the central control tree 200, the establishing module 101 can adjust the serial number of the father node corresponding to the application "C" by replacing "3" with "2", and adjust the serial number of the child nodes corresponding to the application "C" by respectively replacing "31", "32", and "33" with "21", "22", and "23".

At block 52, the obtaining module 102 can obtain voice data.

In at least one embodiment, the obtaining module 102 can obtain the voice data from the voice inputting device 11 when the airflow sensor 12 detects airflow of the mouth or nose of the user.

It should be noted that the obtaining module 102 obtains the voice data when the airflow of the mouth or nose of the user is detected, is to avoid mistakenly obtaining voice data of people except the user who are around the electronic device 100. In other words, more accurate voice data can be obtained if the obtaining module 102 obtains the voice data when the airflow of the mouth or nose of the user is detected.

In other embodiments, the obtaining module 102 can directly obtain the voice data from the voice inputting device 11. In other words, the obtaining module 102 may not require airflow of the mouth or nose of the user to be detected as a precondition for obtaining voice. The electronic device 100 may not include the airflow sensor 12.

In at least one embodiment, the voice inputting device 11 can be a microphone that is internally or externally connected to the electronic device 100. In other embodiments, the voice inputting device 11 can also be an earpiece microphone that is configured on an earphone, which is connected to the electronic device 100.

In at least one embodiments, the obtaining module 102 can further de-noise noise in the obtained voice data to obtain de-noised voice data.

In at least one embodiment, the obtaining module 102 can de-noise the noise in the obtained voice data using an anti-aliasing filter, a pre-emphasis filter, and/or an end point detector.

At block 53, the recognizing module 103 can recognize the de-noised voice data to obtain recognized voice data. It should be noted that if the obtained voice data is not de-noised, the recognizing module 103 can also recognize the obtained voice data that is not de-noised.

In at least one embodiment, the recognized voice data is obtained by converting the de-noised voice data to text information. In other words, the recognized voice data is the converted text information. In at least one embodiments, the recognizing module 103 can convert the de-noised voice data to the text information using a voice recognizing technology.

At block 54, the controlling module 104 can control an operation to the electronic device 100 according to the central control tree based upon the recognized voice data.

In at least one embodiment, the controlling module 104 can determine whether there is a node of the central control tree corresponding to the converted text information, by comparing the converted text information with the text information corresponding to each node of the central control tree. When the converted text information matches the text information corresponding one node of the central control tree, the controlling module 104 can determine the one node of the central control tree which corresponds to the converted text information, and obtain a determined node. The controlling module 104 can trigger a function corresponding to the determined node.

In at least one embodiment, when the determined node is the root node of the central control tree, the controlling module 104 controls the electronic device 100 to execute a first function, such as power off the electronic device 100, or boot the electronic device 100, or lock the electronic device 100, or control the electronic device 100 to enter a sleep state.

In at least one embodiment, when the determined node is a father node of the central control tree, the controlling module 104 controls the electronic device 100 to run the application corresponding to the father node.

For one example, when the determined node is the father node "1" of the central control tree, and the father node "1" corresponds to the telephone application, the controlling module 104 can control the electronic device 100 to run the telephone application.

For another example, when the application corresponding to the father node is run, the controlling module 104 can further broadcast text information corresponding to each of the child nodes of the father node using voices. Then the user can know which function options are included in the application. The obtaining module 102 can further obtain current voice data. The recognizing module 103 can further convert the current voice data to current text information. The controlling module 104 can further determine a current child node corresponding to the current text information by comparing the current text information with the text information of each of the child nodes of the father node. The controlling module 104 can further trigger a function corresponding to the current child node.

For example, when the telephone application of the electronic device is run, the controlling module 104 broadcasts the text information of the function options of the telephone application such as "make a call", "query received calls", "query answered calls", and the "query missed calls" using voices. When the recognizing module 103 recognizes the text information of the current voice data obtained from the voice inputting device 11 is the "query missed calls", the controlling module 104 controls the telephone application to list phone numbers of all missed calls, and display all the phone numbers on the display screen 13.

In at least one embodiment, when one application such as a music application of the electronic device 100 is run, if the electronic device 100 receives an incoming call from another electronic device, the controlling module 104 can broadcast the incoming call using voices, and determine whether to answer the incoming call or not according to voice data inputted by the user.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for controlling an electronic device being executed by a processor of the electronic device, the method comprising:
    establishing a central control tree for the electronic device;
    obtaining voice data;
    recognizing the voice data to obtain recognized voice data; and
    controlling an operation to the electronic device according to the central control tree based upon the recognized voice data;
    wherein the central control tree is established by:
    establishing a single control tree for each of a plurality of applications of the electronic device, and obtaining a plurality of single control trees, wherein each node of each of the plurality of single control trees corresponds to a serial number, wherein root nodes of the plurality of single control trees correspond to a same serial number, and other nodes of the plurality of single control trees correspond to different serial numbers; and
    obtaining the central control tree by merging the plurality of single control trees based upon the serial number corresponding to each node of each of the plurality of single control trees, wherein nodes corresponding to the same serial number are merged to be one node, and the other nodes corresponding to different serial numbers are correspondingly added to the central control tree;
    wherein the method further comprises:
    displaying the central control tree on a display screen of the electronic device in response to user's input;
    deleting a single control tree corresponding to one of the plurality of applications from the central control tree in response to a first signal; and
    adding a single control tree corresponding to a new application to the central control tree in response to a second signal.

2. The method according to claim 1, wherein the voice data is obtained from a voice inputting device of the electronic device when an airflow sensor of the electronic device detects airflow, the method further comprises:
    de-noising noise in the voice data.

3. The method according to claim 1, wherein the serial number corresponding to the each node of each of the plurality of single control trees is set according to an order of creating each of the plurality of single control trees.

4. The method according to claim 1, wherein plurality of single control trees are obtained by:

(a) determining first text information corresponding to a first function of the electronic device, creating a root node of a single control tree and establishing a first relationship between the root node and the first text information;
(b) determining second text information corresponding to one of a plurality of applications, creating a father node of the single control tree, and establishing a second relationship between the second text information and the father node;
(C) determining third text information corresponding to each of a plurality of function options of the one of the plurality of applications, creating a plurality of child nodes for the father node according to a number of the plurality of function options, and establishing a third relationship between each of the plurality of child nodes and corresponding third text information; and
establishing a single control tree for each of other applications of the plurality of applications according to the steps (a)-(c), to obtain the plurality of single control trees each of which corresponds to one of the plurality of the applications.

5. The method according to claim 4, wherein the first function is selected from the group consisting of powering off the electronic device, rebooting the electronic device, locking the electronic device, and controlling the electronic device to enter a sleep state.

6. The method according to claim 5, further comprising:
converting the voice data to text information to obtain converted text information using a voice recognizing technology;
determining a node of the central control tree corresponding to the converted text information by comparing the converted text information with text information of each node of the central control tree; and
triggering a function corresponding to the determined node.

7. The method according to claim 6, further comprising:
when the determined node is a father node of the central control tree, obtaining a determined father node and running an application corresponding to the determined father node; and
broadcasting text information corresponding to each of child nodes of the determined father node.

8. The method according to claim 7, further comprising:
obtaining current voice data;
converting the current voice data to current text information;
determining a current child node corresponding to the current text information by comparing the current text information with the text information of each of the child nodes of the determined father node; and
triggering a function corresponding to the current child node.

9. The method according to claim 1, wherein the first signal is generated when a father node of the single control tree corresponding to the one of the plurality of applications is touched for a predetermined time period, and the second signal is generated when the central control tree is double clicked.

10. The method according to claim 1, further comprising:
when the single control tree corresponding to the one of the plurality of applications is deleted from the central control tree, correspondingly adjust the serial number of each node of other applications of the plurality of applications on the central control tree.

11. An electronic device comprising:
at least one processor; and
a storage device configured to store one or more programs that, when executed by the at least one processor, cause the at least one processor to:
establish a central control tree for the electronic device;
obtain voice data;
recognize the voice data to obtain recognized voice data; and
control an operation to the electronic device according to the central control tree based upon the recognized voice data;
wherein the central control tree is established by:
establishing a single control tree for each of a plurality of applications of the electronic device, and obtaining a plurality of single control trees, wherein each node of each of the plurality of single control trees corresponds to a serial number, wherein root nodes of the plurality of single control trees correspond to a same serial number, and other nodes of the plurality of single control trees correspond to different serial numbers; and
obtaining the central control tree by merging the plurality of single control trees based upon the serial number corresponding to each node of each of the plurality of single control trees, wherein nodes corresponding to the same serial number are merged to be one node, and the other nodes corresponding to different serial numbers are correspondingly added to the central control tree;
wherein the at least one processor is further caused to:
display the central control tree on a display screen of the electronic device in response to user's input;
delete a single control tree corresponding to one of the plurality of applications from the central control tree in response to a first signal; and
add a single control tree corresponding to a new application to the central control tree in response to a second signal.

12. The electronic device according to claim 11, wherein the voice data is obtained from a voice inputting device of the electronic device when an airflow sensor of the electronic device detects airflow, the at least one processor further caused to:
de-noise noise in the voice data.

13. The electronic device according to claim 11, wherein the serial number corresponding to the each node of each of the plurality of single control trees is set according to an order of creating each of the plurality of single control trees.

14. The electronic device according to claim 11, wherein plurality of single control trees are obtained by:
(a) determining first text information corresponding to a first function of the electronic device, creating a root node of a single control tree and establishing a first relationship between the root node and the first text information;
(b) determining second text information corresponding to one of a plurality of applications, creating a father node of the single control tree, and establishing a second relationship between the second text information and the father node;
(C) determining third text information corresponding to each of a plurality of function options of the one of the plurality of applications, creating a plurality of child nodes for the father node according to a number of the plurality of function options, and establishing a third relationship between each of the plurality of child nodes and corresponding third text information; and establishing a single control tree for each of other applications of the plurality of applications according to the steps (a)-(c), to obtain the plurality of single control trees each of which corresponds to one of the plurality of the applications.

15. The electronic device according to claim 14, wherein the first function is selected from the group consisting of powering off the electronic device, rebooting the electronic device, locking the electronic device, and controlling the electronic device to enter a sleep state.

16. The electronic device according to claim 15, wherein the at least one processor further caused to:
convert the voice data to text information to obtain converted text information using a voice recognizing technology;
determine a node of the central control tree corresponding to the converted text information by comparing the converted text information with text information of each node of the central control tree; and
trigger a function corresponding to the determined node.

17. The electronic device according to claim 16, wherein the at least one processor further caused to:
when the determined node is a father node of the central control tree, obtain a determined father node and run an application corresponding to the determined father node; and
broadcast text information corresponding to each of child nodes of the determined father node.

18. The electronic device according to claim 17, wherein the at least one processor further caused to:
obtain current voice data;
convert the current voice data to current text information;
determine a current child node corresponding to the current text information by comparing the current text information with the text information of each of the child nodes of the determined father node; and
trigger a function corresponding to the current child node.

19. The electronic device according to claim 11, wherein the first signal is generated when a father node of the single control tree corresponding to the one of the plurality of applications is touched for a predetermined time period, and the second signal is generated when the central control tree is double clicked.

20. The electronic device according to claim 11, when the single control tree corresponding to the one of the plurality of applications is deleted from the central control tree, correspondingly adjust the serial number of each node of other applications of the plurality of applications on the central control tree.

* * * * *